(12) United States Patent
Onomatsu et al.

(10) Patent No.: US 7,697,078 B2
(45) Date of Patent: *Apr. 13, 2010

(54) BROADCASTING RECEIVER

(75) Inventors: Takehiro Onomatsu, Osaka (JP); Shusuke Narita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 946 days.

This patent is subject to a terminal disclaimer.

(21) Appl. No.: 11/155,872

(22) Filed: Jun. 17, 2005

(65) Prior Publication Data

US 2006/0020997 A1    Jan. 26, 2006

(30) Foreign Application Priority Data

Jun. 18, 2004    (JP)    ............................ P2004-181613

(51) Int. Cl.
    H04N 5/50    (2006.01)
(52) U.S. Cl. ........................................ 348/731; 348/732
(58) Field of Classification Search ......... 348/731–733, 348/725, 726
    See application file for complete search history.

(56) References Cited

U.S. PATENT DOCUMENTS

| 6,774,863 | B2 * | 8/2004 | Shirosaka et al. | 343/797 |
| 7,158,190 | B2 * | 1/2007 | Ikeguchi | 348/731 |
| 7,221,411 | B2 * | 5/2007 | Tani et al. | 348/731 |
| 2006/0015910 | A1 * | 1/2006 | Onomatsu et al. | 725/72 |

FOREIGN PATENT DOCUMENTS

| JP | 6113220 | 4/1994 |
| JP | 6-334931 | 12/1994 |
| JP | 7-95012 | 4/1995 |
| JP | 8-242144 | 9/1996 |
| JP | 11-298226 | 10/1999 |
| JP | 2001-168627 | 6/2001 |

OTHER PUBLICATIONS

Patent Abstracts of Japan, Publication No. 06-334931, Publication Date Dec. 2, 1994, 1 page.
Patent Abstracts of Japan, Publication No. 08-242144, Publication Date Sep. 17, 1996, 1 page.
Patent Abstracts of Japan, Publication No. 11-298226, Publication Date Oct. 29, 1999, 1 page.
Patent Abstracts of Japan, Publication No. 2001-168627, Publication Date Jun. 22, 2001, 1 page.
Notice of the Reason for Refusal for Japanese Patent application No. 2004-181613, mailed November 10, 2009, and English translation thereof, 2 pages.

(Continued)

Primary Examiner—M. Lee
(74) Attorney, Agent, or Firm—Osha • Liang LLP

(57) ABSTRACT

When setting reception channels, channel information and the direction information of a smart antenna are erased from a memory, and thereafter, the broadcast of a predetermined channel is automatically received while the direction of the directivity of the smart antenna is being switched in all directions. From among all the directions of the directionalities, the direction of the directivity as is capable of receiving and reproducing the broadcast of the predetermined channel best is determined, whereupon the channel information of the predetermined channel and the direction information of the determined direction of the directivity are automatically stored in the memory in association with each other.

5 Claims, 4 Drawing Sheets

| CHANNEL INFORMATION | DIRECTION INFORMATION OF SMART ANTENNA |
|---|---|
| 2, ntsc, ··· | 14, LEV**, ··· |
| 4, ntsc, ··· | 1, LEV**, ··· |
| 6, ntsc, ··· | 5, LEV**, ··· |
| ⋮ | ⋮ |
| 69, DTV, ··· | 10, LEV**, ··· |

T

OTHER PUBLICATIONS

English Abstract from esp@cenet, for patent application with Publication No. JP6113220, Publication Date: Apr. 22, 1994, 1 page.

Japanese Office Action for patent application No. 2004-181613, mailed Jan. 19, 2010, and English translation thereof, 4 pages.

* cited by examiner

BROADCASTING RECEIVER

BACKGROUND OF THE INVENTION

1. Field of the Invention

The present invention relates to a broadcasting receiver which receives the broadcasts of predetermined channels transmitted from broadcast stations, by a directivity switching antenna.

2. Description of the Related Art

In Japan, in general, the broadcast electric waves of television broadcasts or the likes are transmitted from a base station in one place. Therefore, substantially all of the broadcasts which a plurality of broadcast stations transmit can be received in such a way that an antenna for receiving the broadcasts is fixed to the roof, the veranda or the like of a house so as to look toward the base station, and that the antenna and a broadcasting receiver are connected by a cable. In contrast, in countries such as United States of America, broadcast electric waves are individually transmitted from a plurality of broadcast stations, respectively. Therefore, when an antenna is fixed looking toward one place, the broadcast of the broadcast station located in a direction in which the antenna looks can be received, but the broadcast of the broadcast station located in a direction in which the antenna does not look cannot be received.

In view of the above circumstances, therefore, broadcasting receivers each of which utilizes an antenna capable of switching the directivity thereof (hereinbelow, termed "directivity switching antenna") have been proposed (refer to JP-A-2001-168627, JP-A-11-298226, and JP-A-6-334931). The directivity switching antenna includes a plurality of antenna elements, and phase shifters, etc. corresponding to the individual antenna elements. It controls the phases of signals received by the respective antenna elements, by the corresponding phase shifters, and then combines the resulting signals, thereby to electrically vary the directivity. Regarding a smart antenna which is one example of the directivity switching antenna, it is stipulated by standards to switch the directivity in the 16 directions of the surroundings. The broadcasting receiver controls such a directivity switching antenna and switches the direction of the directivity of the antenna to a predetermined direction, thereby to receive the broadcast electric wave of a predetermined channel transmitted from a predetermined broadcast station. Thus, even when a user has fixed the directivity switching antenna to the roof or the like of a house, the user can receive almost all the broadcasts transmitted from the plurality of dotted broadcast stations.

In a case where a desired channel is to be set as a reception channel in the broadcasting receiver as mentioned above, the user selects one desired channel by manipulating manipulation means such as a remote controller or switches, whereupon the user switches on the directions of the directionalities of the directivity switching antenna by manipulating the manipulating means. More specifically, the controller of the broadcasting receiver switches on the directions of the directionalities of the directivity switching antenna on the basis of the user's manipulation instructions. On this occasion, the controller processes broadcast electric waves received by the directivity switching antenna and displays pictures on, for example, a television receiving set (hereinbelow, abbreviated to "TV set") in succession. Therefore, the user switches on the directions of the directionalities of the directivity switching antenna in such a way that, while watching the pictures displayed on the TV set, the user manipulates the manipulation means so as to obtain the best picture. Besides, when the direction of the directivity of the directivity switching antenna affording the best picture has been specified, the user sets the channel under reception and the specified direction of the directivity of the directivity switching antenna, in the broadcasting receiver by performing a predetermined manipulation through the manipulation means. Thus, the controller stores in a memory, channel information which indicates the selected channel, and direction information which indicates the direction of the directivity of the directivity switching antenna at this time.

The user can set a plurality of channels in the broadcasting receiver as reception channels by similarly performing the procedures as stated above, for the other channels. Besides, with such settings of the reception channels, when the user has thereafter selected any set channel again by manipulating the manipulation means, the controller reads out of the memory the direction information of the directivity switching antenna corresponding to the particular channel, and it switches the directivity of the directivity switching antenna to the direction indicated by the direction information. Accordingly, the broadcast of the selected channel can be immediately received by the directivity switching antenna, and the best image of the corresponding broadcast can be displayed on the TV set so as to be immediately viewed by the user.

The manual channel settings explained above are disclosed in JP-A-2001-168627, JP-A-11-298226, and JP-A-6-334931. With the manual channel settings, however, the user must switch on the directions of the directionalities of the directivity switching antenna by manipulating the manipulation means while watching the display pictures of the TV set, resulting in the problems that the manipulation becomes complicated, and that a long time is required. Especially, when the number of channels to be set is large, the manipulation becomes very complicated, and a very long time is required. Incidentally, it is stated in Patent Document 2 that, when a channel has been selected by way of example, the controller scans the directivity of the directivity switching antenna in all the directions so as to search for the direction of the level of the maximum reception power, and to hold the directivity of the directivity switching antenna in the direction searched for. However, this operation is performed for bringing the directivity of the directivity switching antenna into agreement with the direction in which the broadcast of the selected channel is receivable, and it is not performed for setting any desired channel. Besides, in a broadcasting receiver as disclosed in JP-A-8-242144 which utilizes an ordinary antenna not having its directivity switched, it is common practice that, when a power source has been turned ON or a predetermined manipulation has been done by way of example, a controller sequentially sweeps frequencies within a reception band so as to automatically store the reception frequencies of broadcast electric waves at and above a predetermined reception level or broadcast electric waves of high reception levels in the channel storing area of a memory.

Meanwhile, the directivity switching antenna fixed to the roof or the like of the house is sometimes moved on account of house-moving, cleaning or the like. When the directivity switching antenna has been moved, those directions of the directionalities of the directivity switching antenna in which the broadcasts of the set channels are receivable change in some cases, so that the broadcasts might fail to be received. Therefore, after the movement of the directivity switching antenna, channels need to be reset. However, in a case where the channel information items of the channels to be reset and the corresponding direction information items of the directivity switching antenna are stored in the memory in resetting the channels, such an inconvenience on a control occurs that, when the user has specified the channel to-be-reset, the controller controls the directivity switching antenna under the influence of the previous set contents so as to switch the directivity to the direction indicated by the corresponding direction information. It is accordingly apprehended that a long time will be expended in setting the channels to-be-reset and the directions of the directionalities of the directivity switching antenna. Incidentally, it is disclosed in JP-A-6-334931 that, when the broadcasting receiver with its directivity switching antenna fixed has been moved, the contents of the memory should preferably be reset so as to set the channels again. Nothing is explained, however, as to what kind of processing the resetting is and when and how the resetting is performed.

SUMMARY OF THE INVENTION

The present invention provides a broadcasting receiver that does not require a complicated manipulation and does not require a long time for the manipulation, either, and in which, in a resetting mode, channels can be set without being influenced by previous set contents.

According to a first aspect of the invention, there is provided a broadcasting receiver for receiving a broadcasting in a predetermined channel transmitted from a broadcasting station by controlling a directivity-switching antenna that switches directivity in a plurality of preset directivity directions, the broadcasting receiver including: a controller that controls the directivity switching antenna to switch the direction of the directivity; and a memory that stores channel information indicating the predetermined channel, and direction information indicating the direction of the directivity of the directivity switching antenna for receiving the broadcast of the channel indicated by the channel information, wherein when setting all receivable channels as reception channels, the controller erases all of the channel information items and the direction information items from the memory, causes the directivity switching antenna to switch the direction of the directivity thereof in all the directions every channel being a preset candidate for reception and to receive the broadcast of the pertinent channel, determines from among all the directions of the directionalities, the direction of the directivity for receiving and reproducing the broadcast of the pertinent channel best, and stores the channel information of the pertinent channel and the direction information of the determined direction of the directivity in the memory in association with each other.

According to a second aspect of the invention, there is provided a broadcasting receiver for receiving a broadcasting in a predetermined channel transmitted from a broadcasting station by controlling a directivity-switching antenna that switches directivity in a plurality of preset directivity directions, the broadcasting receiver including: a controller that controls the directivity switching antenna to switch the direction of the directivity; and a memory that stores channel information indicating the predetermined channel, and direction information indicating the direction of the directivity of the directivity switching antenna for receiving the broadcast of the channel indicated by the channel information, wherein when setting the predetermined channel as a reception channel, the controller erases from the memory the channel information and the direction information that correspond to the predetermined channel, causes the directivity switching antenna to switch the direction of the directivity thereof in all the directions and to receive the broadcast of the predetermined channel, determines from among all the directions of the directionalities, the direction of the directivity for receiving and reproducing the broadcast of the predetermined channel best, and stores the channel information of the predetermined channel and the direction information of the determined direction of the directivity in the memory in association with each other.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Figure 1:
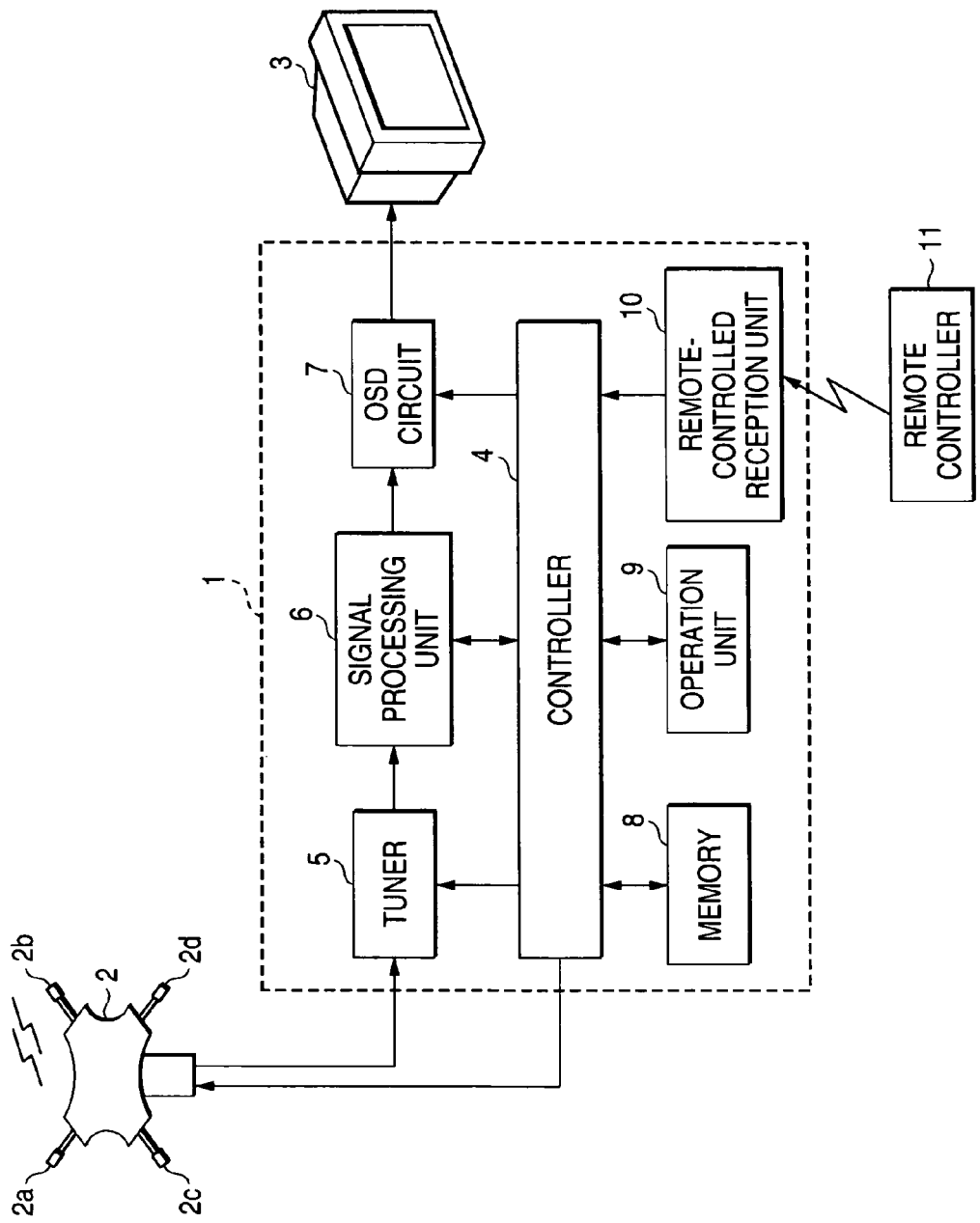
FIG. 1 is a block diagram showing a reception system for a television broadcast.

FIG. 1 is a block diagram showing a reception system for a television broadcast. Referring to FIG. 1, numeral 1 designates a broadcasting receiver, numeral 2 a smart antenna, and numeral 3 a television receiving set (hereinbelow, abbreviated to "TV set"). The broadcasting receiver 1 and the TV set 3 are installed in the house of a general home, and are interconnected by a cable. The smart antenna 2 is mounted on and fixed to the roof or veranda of the house, and is connected with the broadcasting receiver 1 by a cable. This smart antenna 2 includes four antenna elements 2a-2d, phase shifters disposed in correspondence with the respective antenna elements 2a-2d, a combiner, and a control circuit (the others than the antenna elements 2a-2d are not shown). The phases of signals received by the respective antenna elements 2a-2d are controlled by the corresponding phase shifters, and the signals subjected to the controls are combined by the combiner, whereby directionalities are electrically switched in 16 directions.

Figure 2:
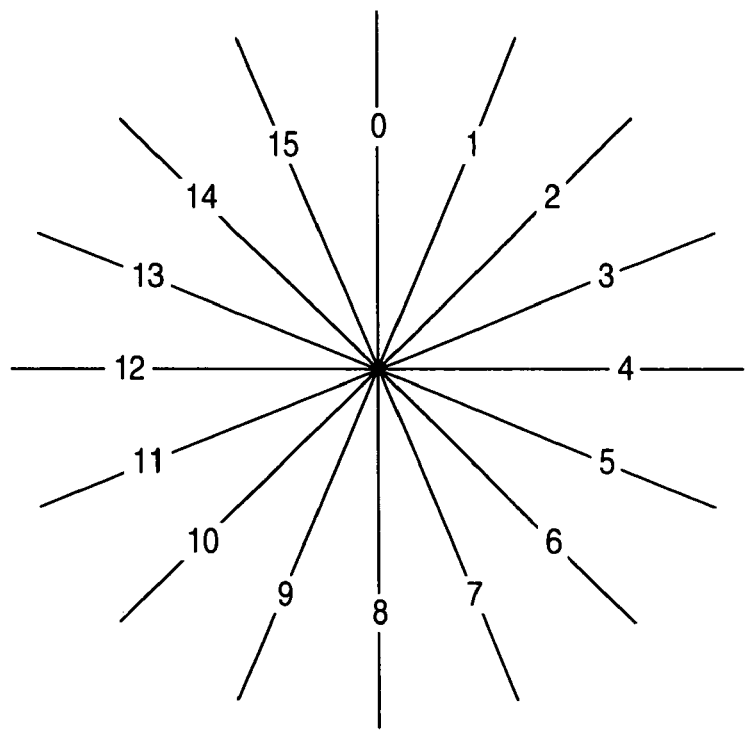
FIG. 2 is a diagram showing the directions of the directionalities of a smart antenna.

FIG. 2 is a diagram showing the directions of the directionalities of the smart antenna 2. Referring to FIG. 2, individual straight lines indicate the directions of the directionalities which the smart antenna 2 switches, and a part at which the respective straight lines intersect with one another indicates the center of the smart antenna 2. Numbers 0-15 represent the individual directions of the directionalities. That is, the smart antenna 2 switches the directionalities in the respective directions which are obtained by dividing its surroundings of 360 degrees by 16. The broadcasting receiver 1 controls the smart antenna 2 and switches the directions of the directivities of this smart antenna 2, thereby to receive any of television broadcast electric waves which are transmitted from a plurality of broadcast stations dotted around the house.

Numeral 4 in FIG. 1 designates a controller which includes a CPU, a ROM, a RAM, etc. Programs and data for controls are stored in the ROM of the controller 4, and data for controls are stored in the RAM in readable and writable fashion. The controller 4 controls the individual parts of the broadcasting receiver 1, and performs a switching control for the direction of the directivity of the smart antenna 2. Numeral 5 designates a tuner, numeral 6 a signal processing unit, and numeral 7 an OSD circuit. The tuner 5 extracts the television broadcast signal of a predetermined channel from among the television broadcast electric waves received by the smart antenna 2. The signal processing unit 6 processes the television broadcast signal outputted from the tuner 5, so as to generate a video signal and an audio signal, which are outputted to the TV set 3. The OSD circuit 7 processes picture data outputted from the controller 4, so as to be capable of presenting them as an OSD (on-screen display) on the TV set 3, and it outputs the processed data to the TV set 3. The TV set 3 processes the video signal and audio signal outputted from the signal processing unit 6, thereby to display and reproduce an image on a monitor and to emit and reproduce a speech from a loudspeaker. Besides, the TV set 3 processes the picture data outputted from the OSD circuit 7, so as to display a picture as the OSD on the monitor.

Figure 3:
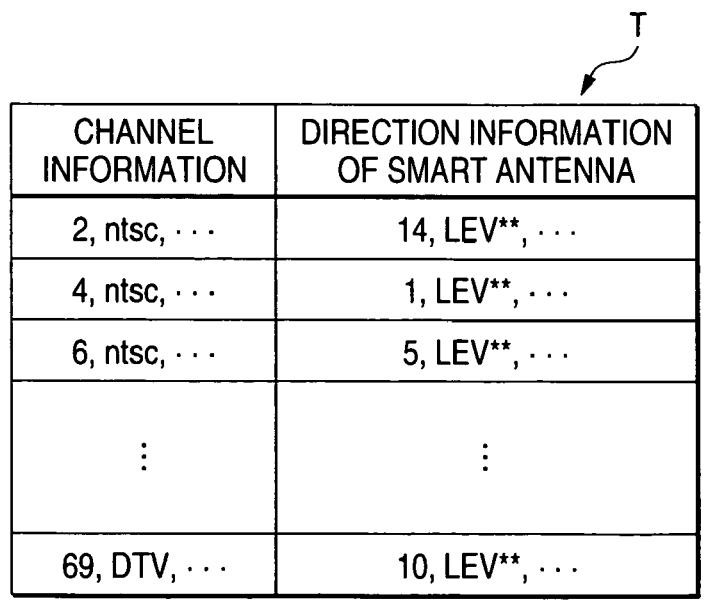
FIG. 3 is a diagram showing an example of the stored contents of a memory which is included in a broadcasting receiver.

Numeral 8 designates a nonvolatile memory. The controller 4 stores channel information items indicating predetermined channels, and direction information items indicating the directions of the directionalities of the smart antenna 2 capable of receiving the broadcasts of the channels, as stated later, in the predetermined area of the memory 8 and in association with each other. FIG. 3 is a diagram showing an example of the stored contents of the predetermined area of the memory 8. The controller 4 stores the channel information and the direction information of the smart antenna 2 in the predetermined area of the memory 8 every channel, whereby a channel setting table T is created in the predetermined area of the memory 8. In the table T, the channel information items are stored on the left side, and the direction information items of the smart antenna 2 associated with the respective channel information items are stored on the right side. The channel information items contain such information as channel Nos. (2, 4, 6, 69, etc.), the distinction between an analog broadcast (NTSC) and a digital broadcast (DTV) and the distinction between a VHF band and a UHF band. The direction information items of the smart antenna 2 contain such information as direction Nos. (14, 1, 5, 10, etc.) indicating the directions of the directionalities, and the reception levels (LEV**) of broadcast electric waves received in the directions. Incidentally, the "reception level" signifies the reception signal intensity of a received broadcast electric wave in a case where the broadcast electric wave is analog, and it signifies the bit error rate of a received broadcast electric wave in a case where the broadcast electric wave is digital.

Numeral 9 in FIG. 1 designates an operation unit which includes various keys such as channel keys and a power source key. Numeral 10 designates a remote-controlled reception unit, which receives a signal from a remote controller 11. The remote controller 11 includes various keys such as the channel keys, menu keys and ten-keys.

In the above configuration, the broadcasting receiver 1 constructs one embodiment of a broadcasting receiver in the present invention. The smart antenna 2 constructs one embodiment of a directivity switching antenna in the invention. The controller 4 constructs one embodiment of a controller in the invention. The memory 8 constructs one embodiment of a memory in the invention.

Figure 4:
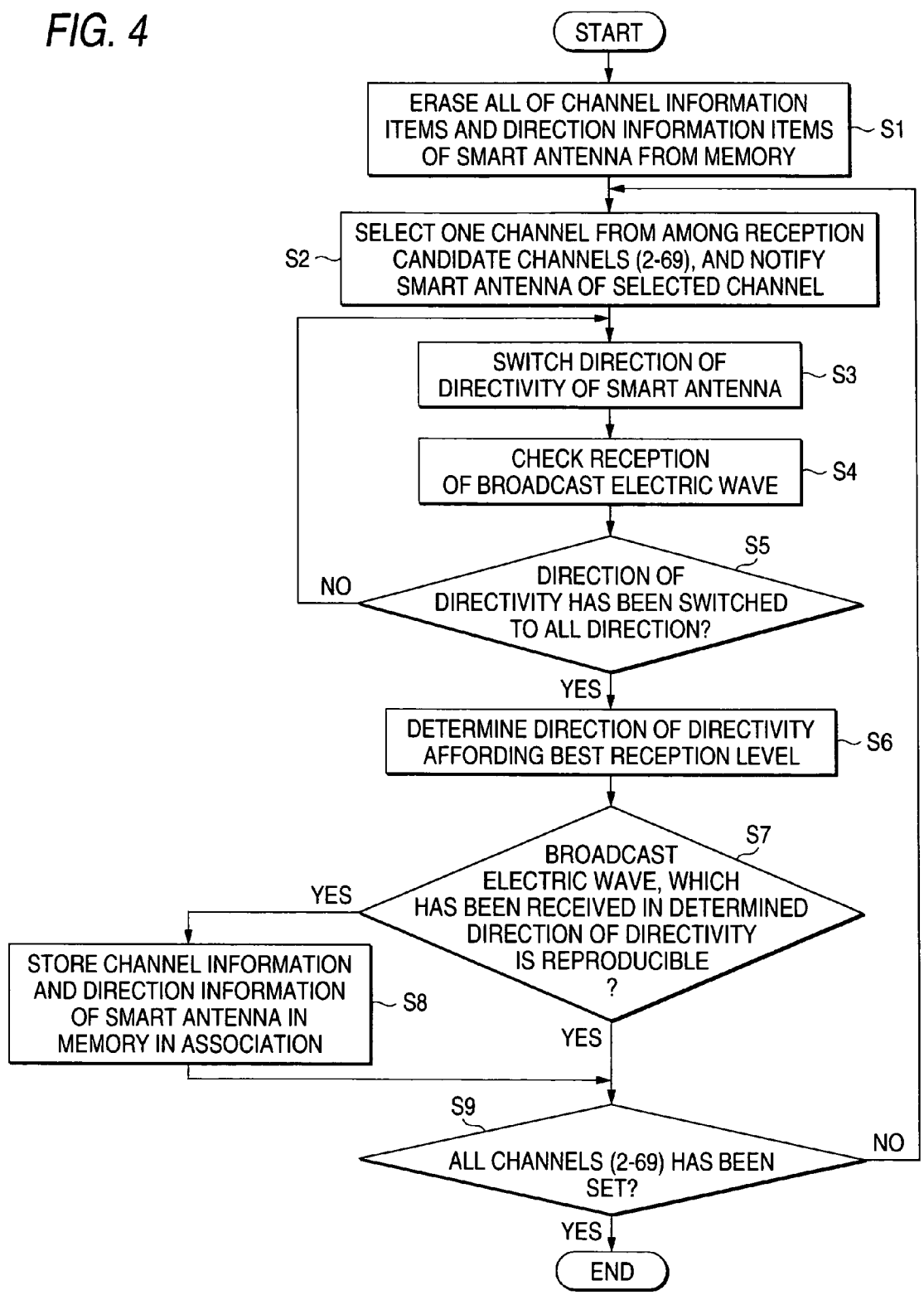
FIG. 4 is a flow chart showing the procedure of the autoscan process of the broadcasting receiver.

FIG. 4 is a flow chart showing the procedure of an autoscan process which is performed in the broadcasting receiver 1. The procedure is executed in accordance with the programs stored in the ROM, by the controller 4 mentioned before. Incidentally, the "autoscan process" is a process which automatically scans (searches for) all the receivable channels so as to set them as reception channels. The autoscan process is started by the controller 4 when a user has connected the broadcasting receiver 1 and the smart antenna 2 and turned ON a power source for the first time, or when the user has manipulated the remote controller 11 and instructed the controller 4 to execute the autoscan process.

Referring to FIG. 4, when the autoscan process has been started, the controller 4 first erases all of the channel information items and the direction information items of the smart antenna 2 from the predetermined area of the memory 8 stated before (step S1). By the way, in a case where the autoscan process on this occasion is executed in the broadcasting receiver 1 for the first time (first autoscan process), the channel setting table T shown in FIG. 3 is not stored in the predetermined area of the memory 8 yet, and hence, the processing of the step S1 fails. Next, the controller 4 selects one channel from among the channels of candidates for receptions (Channel 2-Channel 69) as are set (stored) in the ROM beforehand, and it notifies the smart antenna 2 of the channel number of the selected channel (step S2). The selections of such channels are successively done from the channel of the smallest number by way of example. When notified of the channel number, the smart antenna 2 sets the individual parts so that the electric wave of the frequency band corresponding to the particular channel number can be received.

Subsequently, the controller 4 transmits to the smart antenna 2 a control signal which indicates the switching of the direction of the directivity to any of the directions 0-15 in accordance with a switching sequence set (stored) in the ROM beforehand, and it thus causes the smart antenna 2 to switch the direction of the directivity (step S3). The operations of switching such directions of the directionalities are successively done from the direction of the smallest number (successively clockwise from the direction "0" in FIG. 2) by way of example. When the controller 4 has caused the smart antenna 2 to switch the direction of the directivity, it checks the reception of the broadcast electric wave of the selected channel (step S4). Here, when the controller 4 has received the broadcast electric wave of the channel selected by the smart antenna 2, it detects the reception level of the particular broadcast electric wave so as to temporarily store the detected level in the RAM together with the direction number which indicates the direction of the directivity switched by the smart antenna 2. After having checked the reception, the controller 4 shifts to the step S3 on condition that the direction of the directivity of the smart antenna 2 has not been switched to all the directions yet (step S5: NO). Then, the controller 4 iteratively executes the processing of the steps S3-S5 in accordance with the same procedure as in the above.

Besides, when the controller 4 has confirmed at the step S5 that the direction of the directivity of the smart antenna 2 has been switched to all the directions (step S5: YES), it determines the direction of the directivity of the smart antenna 2 affording the best reception level, with reference to the reception levels and direction Nos. of the broadcast electric waves temporarily stored in the RAM (step S6). Subsequently, the controller 4 decides whether or not the broadcast electric wave received in the determined direction of the directivity lies at a reception level capable of reproducing a broadcast image by the TV set 3 (step S7). More specifically, the controller 4 decides whether or not the reception level of the received broadcast electric wave is better than a preset level capable of reproducing the broadcast image. Here, if the received broadcast electric wave lies at the reception level capable of reproducing the broadcast image (step S7: YES), the controller 4 stores the channel information of the selected channel and the direction information of the determined direction of the directivity of the smart antenna 2 in the predetermined area of the memory 8 in association with each other (step S8). Thus, a state is established where the selected channel has been set as a reception channel. After having stored the information items, the controller 4 shifts to a step S9. On the other hand, unless the received broadcast electric wave lies at the reception level capable of reproducing the broadcast image (step S7: NO), the controller 4 shifts to the step S9 without executing the processing of the step S8. Thus, a state is established where the selected channel has not been set as a reception channel.

When, at the step S9, all the channels being the candidates for receptions (Channel 2-Channel 69) have not been selected yet (step S9: NO), the controller 4 shifts to the step S2, and it iteratively executes the processing of the steps S2-S9 in accordance with the same procedure as in the above. Besides, when the controller 4 has confirmed the completion of the selections of all the channels of the reception candidates at the step S9 (step S9: YES), it ends the autoscan process.

When the autoscan process has been ended as stated above, the channel setting table T is created in the predetermined area of the memory 8 as shown in FIG. 3, and a state is established where all the receivable channels have been set as the reception channels. Thus, when the user has thereafter selected one set channel by manipulating the remote controller 11, the controller 4 reads out of the table T the direction information of the smart antenna 2 corresponding to the selected channel, and it causes the smart antenna 2 to switch the direction of the directivity to the direction which is indicated by the corresponding direction information, whereby the broadcast electric wave of the selected channel can be received immediately and favorably. Besides, the controller 4 causes the above-mentioned tuner 5 and signal processing unit 6 to process the received broadcast electric wave, whereby an image and a speech can be respectively displayed on and emitted from the TV set 3 immediately and favorably.

In the above way, all the receivable channels are automatically set in the broadcasting receiver 1 as the reception channels. Therefore, the embodiment does not make the user's manipulation very complicated and does not require a long time, either, as in manual channel settings in the prior art, so that it is very advantageous. Moreover, the direction of the directivity of the smart antenna 2 is switched on after all the channel information items and direction information items have been erased from the memory 8. Therefore, in a case where channels are to be reset by the autoscan process because the smart antenna 2 has been moved by reason of house-moving or the like, the channels can be set without being influenced by previous set contents. Accordingly, it is not apprehended as in the prior art that a long time will be expended on the channel settings due to any inconvenience on an antenna control.

Figure 5:
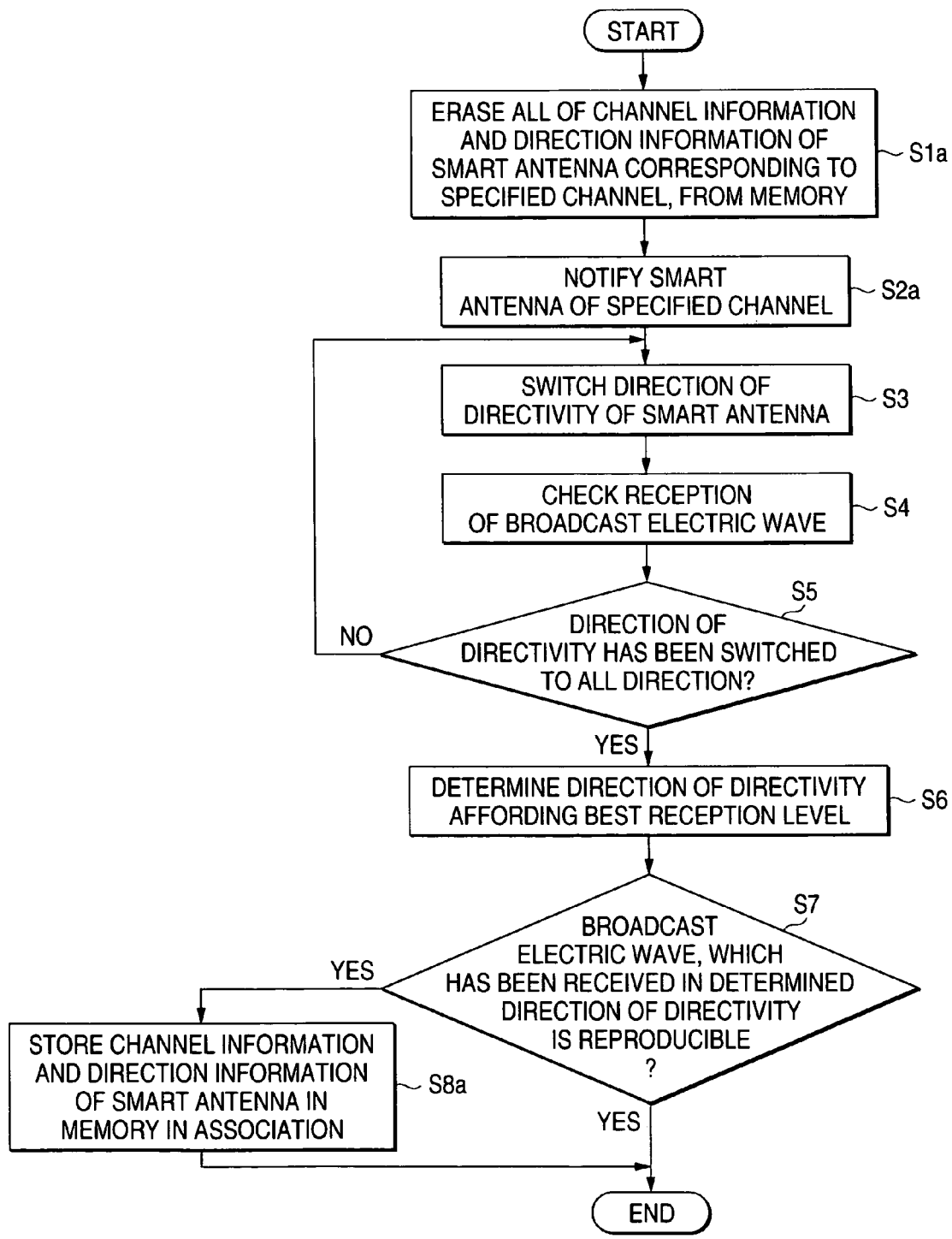
FIG. 5 is a flow chart in another embodiment.

In the foregoing embodiment, there has been mentioned the example in which the present invention is applied to the case of setting all the receivable channels as the reception channels. The invention, however, is also applicable to a case of setting only a specified channel as a reception channel. FIG. 5 is a flow chart showing an embodiment in this case. By the way, in FIG. 5, identical signs are assigned to the same processing steps as in FIG. 4. The controller 4 starts the process of FIG. 5 on an occasion, for example, where the user has manipulated the remote controller 11 to give the instruction of setting the desired channel as the reception channel for the first time or again. First, the controller 4 erases the channel information and the direction information of the smart antenna 2 corresponding to the specified channel, from the predetermined area of the memory 8 (step S1a). By the way, in a case where the channel specified on this occasion is to be set for the first time (the specified channel has never been set), the channel information and the direction information of the smart antenna 2 corresponding to the particular channel are not stored in the predetermined area of the memory 8 yet, and hence, the processing of the step S1a fails. Next, the controller 4 notifies the smart antenna 2 of the channel number of the specified channel (step S2a). Thereafter, the controller 4 executes the processing of the step S3, et seq. in accordance with the same procedure as described before. Besides, if a broadcast electric wave received by the smart antenna 2 in the direction of the directivity determined at the step S6 lies at a reception level capable of reproducing a broadcast image (step S7: YES), the controller 4 stores the channel information of the specified channel and the direction information of the determined direction of the directivity of the smart antenna 2 in the predetermined area of the memory 8 in association with each other (step S8a). Incidentally, when the channel setting table T (FIG. 3) has already been created in the predetermined area of the memory 8 on this occasion, the controller 4 additionally stores the channel information and direction information at this time, in the channel setting table T. After having stored the information items, the controller 4 ends the process.

In the above way, the channel specified by the user's instruction is automatically set in the broadcasting receiver 1 as the reception channel. Therefore, the embodiment does not make the user's manipulation very complicated and does not require a long time for the manipulation, either, as in manual channel settings in the prior art. Moreover, the direction of the directivity of the smart antenna 2 is switched after the channel information and direction information corresponding to the specified channel of the instruction have been erased from the memory 8. Therefore, in the case where the particular channel is to be reset, it can be set without being influenced by previous set contents. Accordingly, it is not apprehended as in the prior art that a long time will be expended on the channel setting due to any inconvenience on an antenna control.

In each of the foregoing embodiments, there has been mentioned the example in which the present invention is applied to the broadcasting receiver 1 that has the smart antenna 2 connected thereto. The invention, however, is also applicable to, for example, a broadcasting receiver to which an antenna different from the smart antenna, capable of switching its directivity in a plurality of directions like an adaptive array antenna is connected. Besides, the invention is applicable to, for example, a broadcasting receiver which receives radio broadcasts, or a broadcasting receiver which receives satellite broadcasts.

As described above, the predetermined channel is automatically set in the broadcasting receiver as the reception channel. Therefore, a user's manipulation does not become complicated and does not require a long time, either, as in a manual channel setting in the prior art. Moreover, after the channel information and direction information which correspond to the predetermined channel have been erased from the memory, the direction of the directivity of the directivity switching antenna is switched on. In a resetting mode, therefore, the channel can be set without being influenced by previous set contents. Accordingly, it is not apprehended as in the prior art that a long time will be expended on the channel setting due to any inconvenience on an antenna control.

According to the broadcasting receiver, all the receivable channels are automatically set in the broadcasting receiver as the reception channels. Therefore, the broadcasting receiver does not make a user's manipulation very complicated and does not require a long time, either, as in manual channel settings in the prior art, so that it is very advantageous. Moreover, the direction of the directivity of the directivity switching antenna is switched on after all the channel information items and direction information items have been erased from the memory. In a resetting mode, therefore, the channels can be set without being influenced by previous set contents. Accordingly, it is not apprehended as in the prior art that a long time will be expended on the channel settings due to any inconvenience on an antenna control.

According to the broadcasting receiver, all the receivable channels are automatically set in the broadcasting receiver as the reception channels. Therefore, the broadcasting receiver does not make a user's manipulation very complicated and does not require a long time, either, as in manual channel settings in the prior art, so that it is very advantageous. Moreover, the direction of the directivity of the smart antenna is switched on after all the channel information items and direction information items have been erased from the memory. In a resetting mode, therefore, the channels can be set without being influenced by previous set contents. Accordingly, it is not apprehended as in the prior art that a long time will be expended on the channel settings due to any inconvenience on an antenna control.

According to the broadcasting receiver, after channel information and direction information which correspond to a predetermined channel have been erased from a memory, the direction of the directivity of a directivity switching antenna is switched, and the predetermined channel is automatically set in a broadcasting receiver as a reception channel. Therefore, a manipulation does not become complicated and does not require a long time, either. Further, in a resetting mode, channels can be set without being influenced by previous set contents.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A broadcasting receiver for receiving a broadcasting in a plurality of channels transmitted from a broadcasting station by controlling a directivity of a directivity-switching antenna in a plurality of preset directions, the broadcasting receiver comprising:

a selector that selects one of the channels, a controller that controls the directivity of the directivity switching antenna to scan all of the preset directions to determine one direction in which the direetivity switching antenna receives the selected channel in the best reception level; and a memory that stores channel information indicating the selected channel and direction information indicating the determined direction of the directivity and a reception level for the selected channel in the determined direction, in association with each other, wherein in an initial auto-scanning process, the selector selects all of the channels in sequence, the controller controls the directivity of the directivity switching antenna to determine each direction in which the directivity switching antenna receives each channel in the best reception level, and the memory stores each channel information and each direction information in association with each other, and wherein in an reset auto-scanning process which is performed after the initial auto-scanning process, the memory first erases all of the channel information and all of the direction information which have been stored in the memory in association with each other, and then the selector, the controller, and the memory perform the same operations as those of the initial auto-scanning process.

2. A broadcasting receiver for receiving a broadcasting in a plurality of channels transmitted from a broadcasting station by controlling a directivity of a directivity-switching antenna in a plurality of preset directions, the broadcasting receiver comprising:

a selector that selects one of the channels, a controller that controls the directivity of the directivity switching antenna to scan all of the present directions to determine one direction in which the directivity switching antenna receives the selected channel in the best reception level; and a memory that stores channel information indicating the selected channel and direction information indicating the determined direction of the directivity and a reception level for the selected channel in the determined direction, in association with each other, wherein in an initial auto-scanning process, the selector selects one of the channels, the controller controls the directivity of the directivity switching antenna to determine one direction in which the directivity switching antenna receives the one channel in the best reception level, and the memory stores the channel information and the direction information in association with each other, and wherein in an reset auto-scanning process, which is performed after the initial auto-scanning process, the memory first erases all of the channel information and all of the direction information which have been stored in the memory in association with each other, and then the selector, the controller, and the memory perform the same operations as those of the initial auto-scanning process.

3. The broadcasting receiver according to claim 2, wherein in the initial auto-scanning process, the selector selects all of the channels in sequences, the controller controls the directivity of the directivity switching antenna to determine each direction in which the directivity switching antenna receives each channel in the best reception level, and the memory stores each channel information and each direction information in association with each other.

4. The broadcasting receiver according to claim 1, wherein the reception level to be stored in the memory is a bit error rate.

5. The broadcasting receiver according to claim 2, wherein the reception level to be stored in the memory is a bit error rate.

* * * * *